United States Patent [19]
Angel et al.

[11] Patent Number: 5,944,449
[45] Date of Patent: *Aug. 31, 1999

[54] NON-ABRASIVE SUBSEA MAT

[75] Inventors: Thomas M. Angel, Houma; Robbie Boudreaux, Montegut, both of La.

[73] Assignee: Submar, Inc., Houma, La.

[*] Notice: This patent is subject to a terminal disclaimer.

[21] Appl. No.: 09/042,282

[22] Filed: Feb. 17, 1998

Related U.S. Application Data

[63] Continuation of application No. 08/633,472, Apr. 17, 1996, Pat. No. 5,722,795.

[51] Int. Cl.⁶ ............................................ F16L 1/12
[52] U.S. Cl. .................... 405/172; 405/17; 405/158
[58] Field of Search ................... 405/16–18, 20, 405/19, 172, 169–171, 158; 404/35, 40, 41

[56] References Cited

U.S. PATENT DOCUMENTS

| | | | |
|---|---|---|---|
| 4,375,928 | 3/1983 | Crow et al. | 405/20 |
| 4,407,606 | 10/1983 | Larsen . | |
| 4,469,468 | 9/1984 | Larsen . | |
| 4,683,156 | 7/1987 | Waters | 405/20 X |
| 5,108,222 | 4/1992 | Jansson et al. | 405/20 |
| 5,193,937 | 3/1993 | Miller . | |
| 5,409,325 | 4/1995 | Wu | 404/41 X |
| 5,443,329 | 8/1995 | De Geeter | 405/172 |
| 5,449,020 | 9/1995 | Matiere . | |
| 5,476,343 | 12/1995 | Sumner . | |
| 5,775,835 | 7/1998 | Szekely | 404/34 |

FOREIGN PATENT DOCUMENTS

| | | |
|---|---|---|
| 2735135 | 7/1977 | Germany . |
| 7707168 | 6/1977 | Netherlands . |
| 962713 | 10/1982 | Russian Federation . |
| 1558427 | 1/1980 | United Kingdom . |
| 2084286 | 4/1982 | United Kingdom . |

*Primary Examiner*—Dennis L. Taylor
*Attorney, Agent, or Firm*—Wendy K. Buskop; Bayko Gibson et al

[57] ABSTRACT

Non-abrasive and non-shielding pads are attached to the at least one side of concrete elements with polymeric based fasteners that are embedded into a cast material, such as concrete, when the latter is soft. A flexible rope is laced through the center of each element in two directions to form a mat in a row-column array, and a groove is established to interconnect two mats together. Adequate spacing is provided between each element to allow the mat to conform to an uneven seabed or structure. The non-abrasive non-shielding pads separate the elements from the underwater installation to prevent the elements from scratching and permitting cathodic protection of the structures. Grooves are provided in selected elements, and loops are provided at the outer edges of the mat to enable several mats to be linked together.

29 Claims, 7 Drawing Sheets

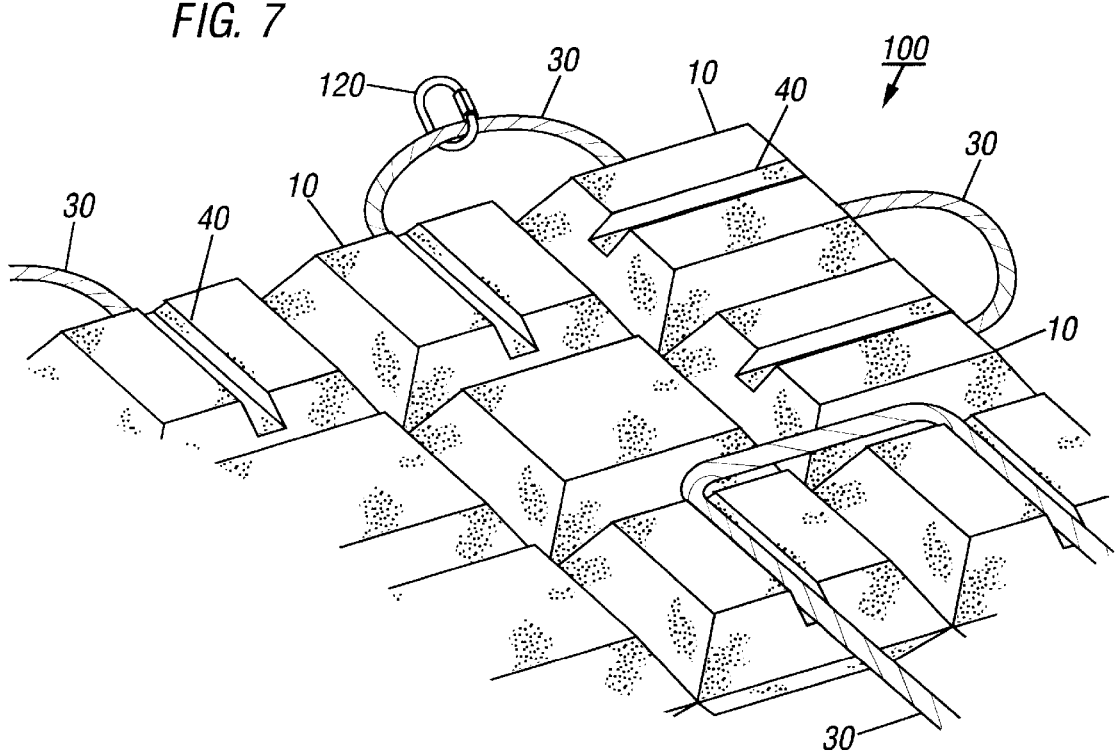
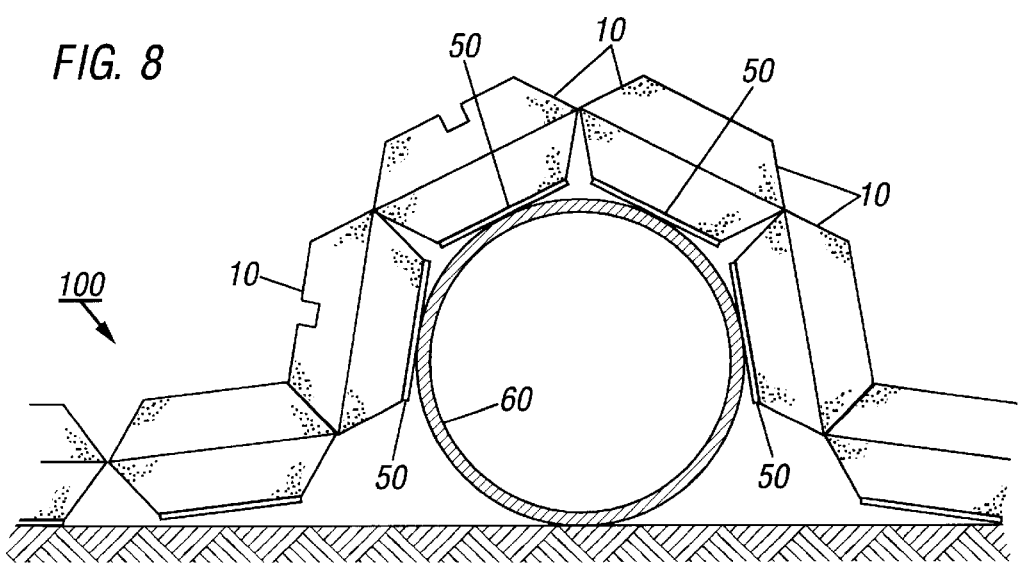

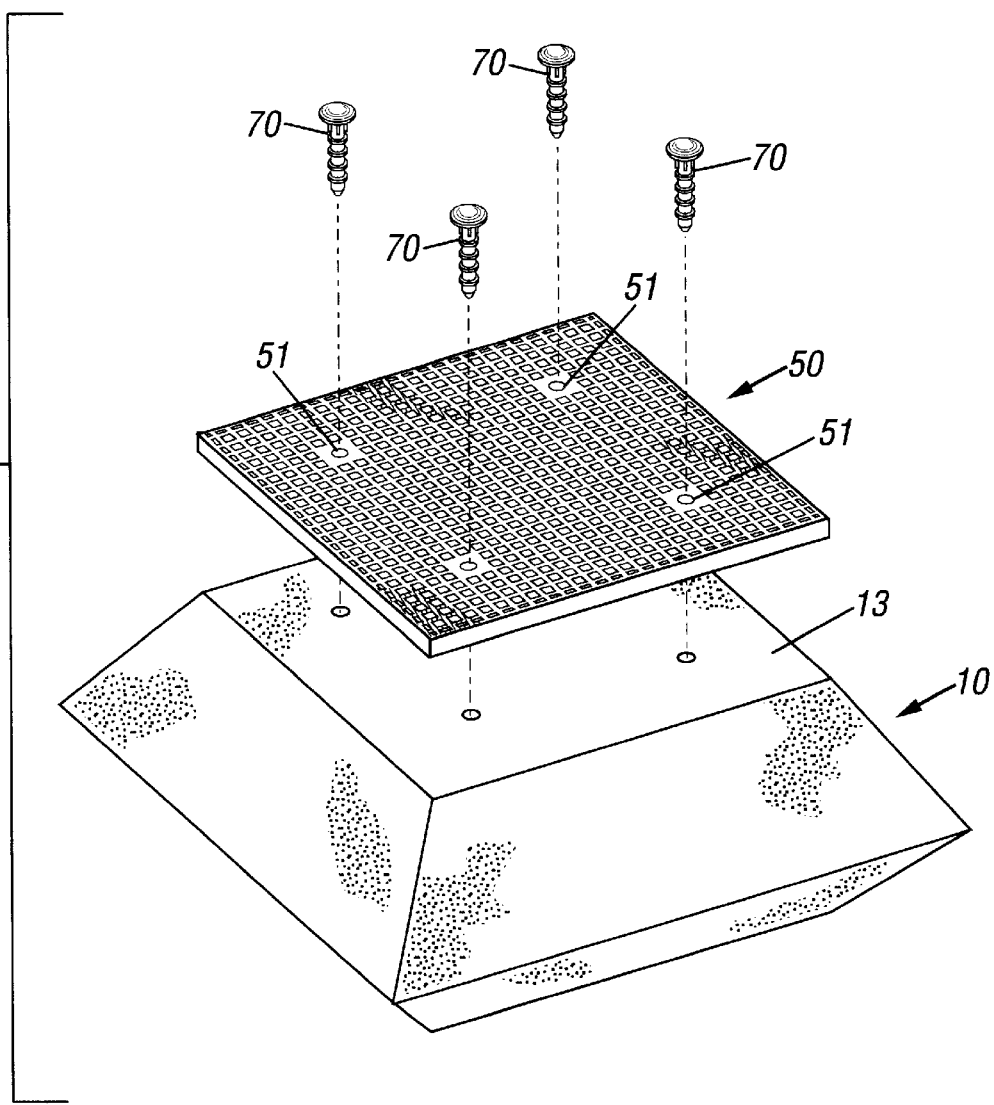
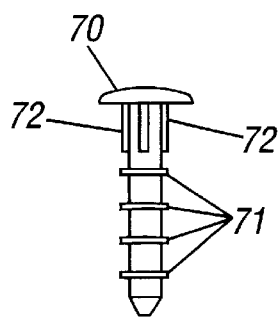

NON-ABRASIVE SUBSEA MAT

CROSS REFERENCES TO RELATED APPLICATIONS

This application continuation application of application Ser. No. 08/633,472, filed Apr. 17, 1996, now to be U.S. Pat. No. 5,722,795, to issue Mar. 3, 1998.

FIELD OF THE INVENTION

The present invention relates to an improvement for subsea protective mats having nonabrasive pads. More particularly, the present invention relates to mats that stabilize and protect metal underwater pipes and other metallic seabed installations, or subsea installations or shoreline protectors.

BACKGROUND OF THE INVENTION

Articulated mats are used for offshore coastal and marine applications where separation, stabilization, protection, and impact prevention is needed for pipelines and other underwater installations. These mats are particularly useful in areas where considerable hydrodynamic forces are generated by bottom currents and waves. For example, a seabed pipeline can be covered with such a mat so that the pipeline is stabilized by the weight of the mat and protected from impact. Another benefit of the mat is its ability to prevent erosion of the adjoining seabed. Examples of articulated mats, their components, and their uses are given in European patent specification 0152232, and U.S. Pat. Nos. 2,876,628; 2,674,856; 4,370,075; 4,357,928; 4,417,828; 5,052,859; and 5,193,937.

The most effective soil covering is concrete because of its high tensile and compressive strength and its almost endless resistance to the action of natural types of water. Concrete mats alone can scratch pipelines and underwater structures. The scratching of the epoxy coating is detrimental to the pipeline or metallic structure because the epoxy provides protection from external environmental conditions that cause the pipeline to corrode. Prior art mats required a tunnel with an insulating material as shown in U.S. Pat. No. 5,193,937 to prevent abrasion and unwanted thermal conduction. Others use solid antiabrasion mats which do not permit cathodic protection of the metallic structure. Additionally, prior art mats have traditionally be unable to be easily linked to one another after installation.

There is, therefore, a need in the art for an articulated seabed mat that can be easily landed on the seabed, particularly in deep waters, and linked to other mats. There is also a continuing need in the art for improved subsea mats that additionally do not scratch or ablate the protective epoxy coating of underwater pipelines and other underwater installations.

SUMMARY OF THE INVENTION

To prevent abrasion of sensitive underwater installations, the present invention provides special non-abrasive pads which are additionally non-shielding that can be attached to at least one side of separate concrete elements. The pads can be attached with fasteners made of polymeric material, such as nylon, which are then embedded into the concrete when the latter is soft. The non-abrasive and non-shielding pads separate the concrete elements from the underwater installation to prevent the concrete elements from scratching and ablating the cathodic protection system by having unique non-solid surfaces contacting the underwater installations. The fasteners, in conjunction with the non-abrasive pads, are selected from materials that protect the epoxy film that protects pipelines and will not be damaged yet are strong enough to provide secure attachment to the concrete element.

The present invention also solves the problem of linking multiple mats in various patterns by including a groove in selected concrete elements that can accommodate the external rope loops used to transport and install the mats. These rope loops can be made long enough such that, when the rope loop is placed in the groove, the first mat is brought adjacent to the second mat and detachably secured. The groove-loop interconnection method allows for unusual linking configurations to be employed that can accommodate equally unusual seabed situations, as well as shoreline situations.

In order that the invention can be more fully understood, various embodiments thereof will now be described, by way of example only, with reference to the accompanying drawings. It is anticipated that the mats can be of various sizes, the ropes can be of various materials, the mat elements can be of various geometric shapes, and the pad can be of various materials.

BRIEF DESCRIPTION OF THE DRAWINGS

FIG. 7 is a perspective view of an assembled mat showing the rope loops;

FIG. 8 is a side view of the present invention disposed around a pipe on a seabed;

FIG. 9 is a perspective view of the subsea mat, with non-abrasive pad, of the present invention;

FIG. 10 is a side view of a fastener;

DETAILED DESCRIPTION OF THE INVENTION

Figure 1:
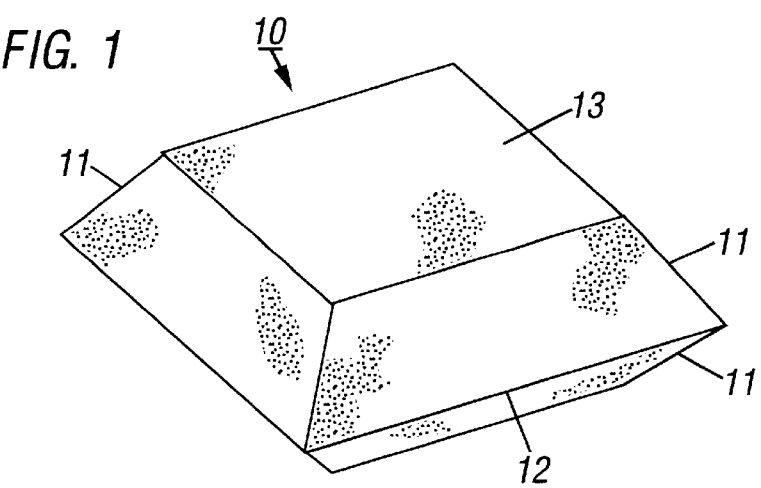
FIG. 1 is a perspective view of a single concrete element of the present invention.
Figure 2:
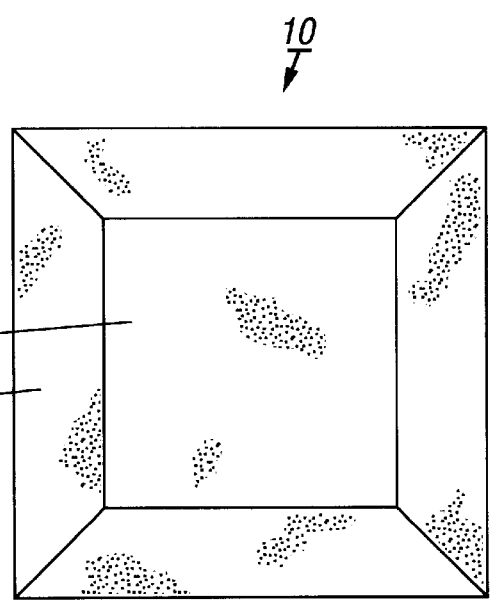
FIG. 2 is a top view of a single concrete element of the present invention.
Figure 3:
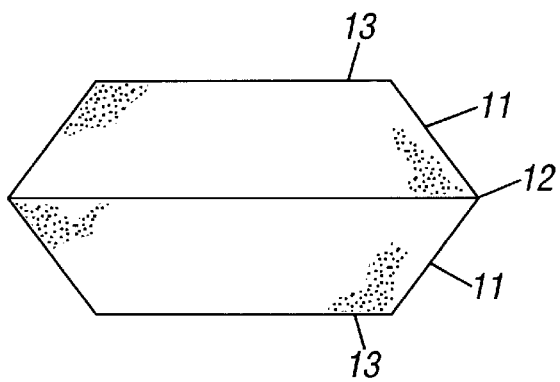
FIG. 3 is a side view of a single concrete element of the present invention.
Figure 4:
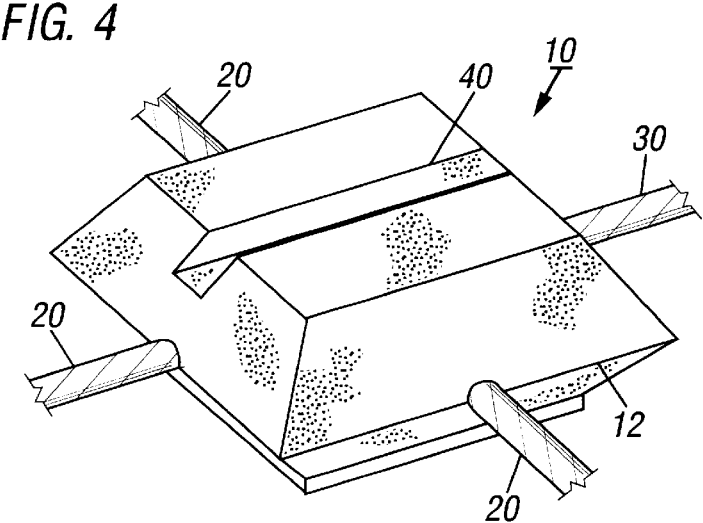
FIG. 4 is a perspective view of a single element with the rope.
Figure 5:
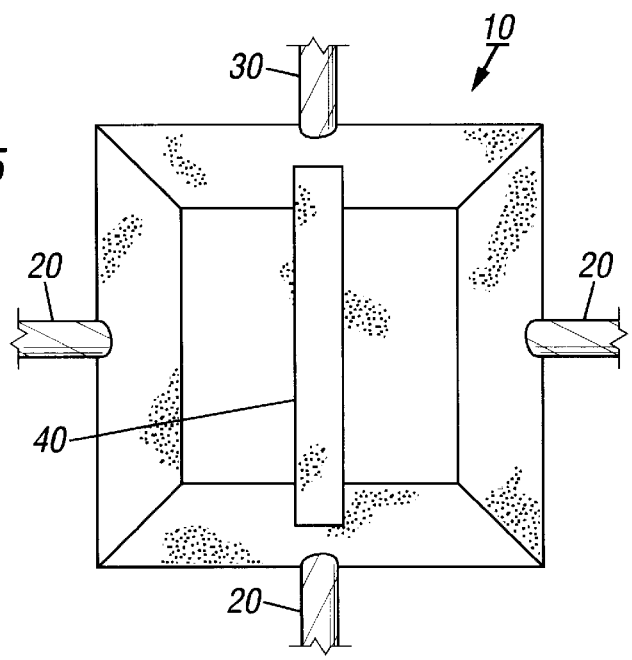
FIG. 5 is a top view of the element of FIG. 4.

The base component of the present invention is a concrete element. Although there are a number of suitable shapes, the preferred embodiment is shown in FIG. 1. The best shape for the concrete element 10 is two symmetrically opposed elements, such as elements, 11 however, other shapes such as conical elements with a tapered surface to a face can be used. Any geometric shape can be used provided the shape can be tempered and have at least one face with can receive a non-abrasive non-shielding pad. The shape of the element must be able to enhance sediment collection around the mat once they are installed. The common rectangular base of the two opposing elements 11 form the center 12 of the concrete element 10. The flat base prevents the mats from sinking into the installation surface. Each of the elements 11 is truncated at its top to form a face 13 as shown in FIGS. 1, 2 and 3.

Figure 13:
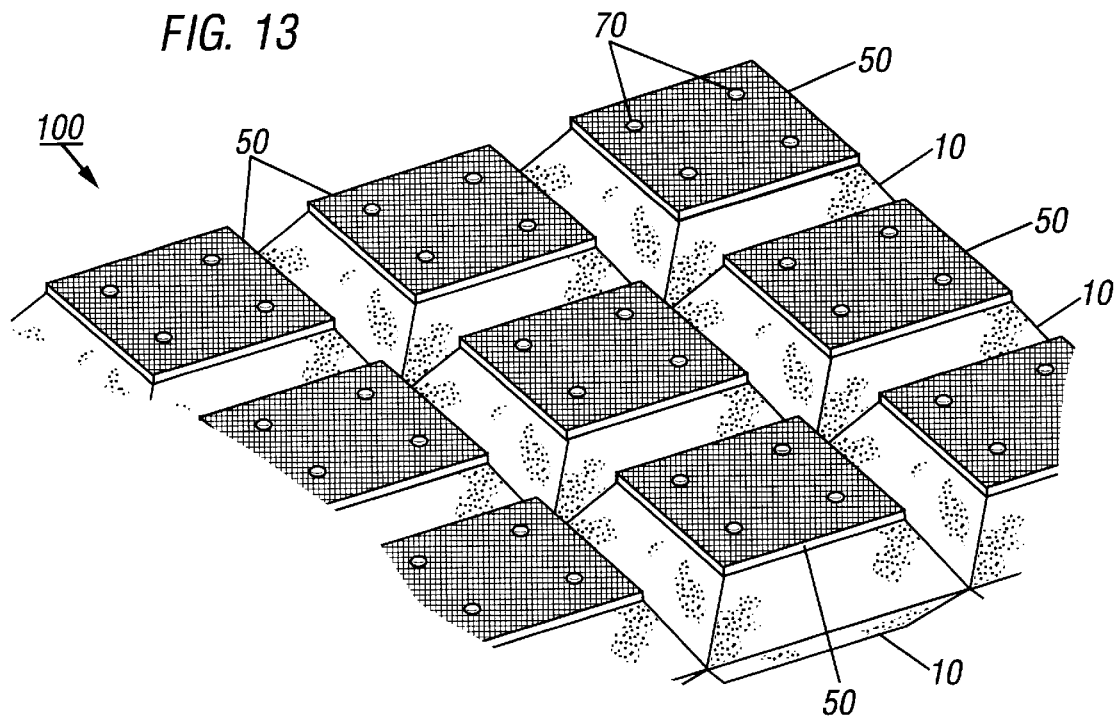
FIG. 13 is a perspective view of the mat with the non-shielding and non-abrasive pad attached.

To make a useful mat 100, preferably for deepwater use, over 2000 feet, the elements 10 are arranged in a row and column array as shown in FIGS. 7 and 13. A flexible rope 20 is used to attach the elements 10 preferably made of concrete to one another. Although the rope 20 can be attached to the elements 10 in a variety of fashions, it is best to form the concrete elements 10 around an orthogonal grid layout of ropes 20 to form a lace. The orthogonal grid is useful, however, the individual units can be square, round or any other shape desired. In this way, rope 20 can pass thorough the center 12 of the element 10 in two directions as shown in FIGS. 4,5,6 and 7, which allows for maximum flexibility of the mat 100. If there is a perceived need to have the center of gravity of the mat 100 as close to the one of faces 13 as possible, the mats may be laced at the particular face 13 of each element 10 (not shown). The rope can be of a variety of thicknesses such as ½ inch thickness for concrete elements which are 9" thick. The rope must be selected for strength and safety factors. For example a braided ⅝" rope capable of supporting 10,600 lbs with a breaking strength of 9500 lbs is a preferred embodiment. ¾ inch rope can also be used. In the preferred embodiment, it is preferred to use a 3 braid rope. Copolymer ropes made of polypropylene, polyethylene, polyketone, polybutylene or mixtures thereof, stabilizers such as additives that provide UV resistance, impermeability to chemicals and marine organisms are preferred, fillers and related additives.

Figure 6:
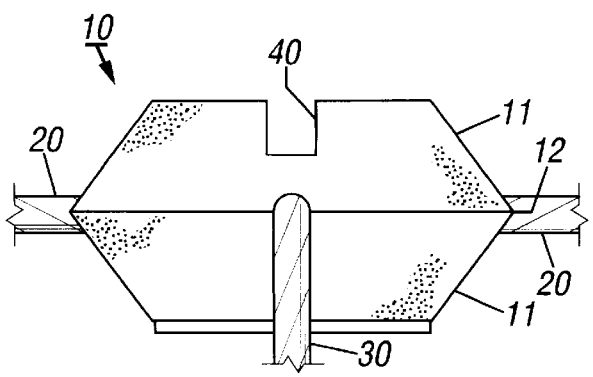
FIG. 6 is a side view of the element of FIG. 4.

The lace of the rope 20 leaves a small loop 30 at the exit and entrance of alternating rows and columns in the rope grid layout as shown in FIGS. 7 and 13. These small loops 30 are used to facilitate the handling and transportation of the mat 100. Elements 10 at the edge of the subsea mat 100 can be fitted with a groove 40 on one face 13 of the element 10 as shown in FIG. 6. The groove 40 is constructed and arranged to allow the small loop 30 of a first subsea mat 100 to be placed within the groove 40 of a second subsea mat 100, thereby attaching the mats together. To complete the locking of mats, the small loop 30 of the second subsea mat 100 can be placed within the groove 40 of the first subsea mat 100.

The rope needs holding power once the cement cures around it during the manufacturing process. Therefore, the larger the diameter the better. For example, a multiple-braid rope, such as a 3 braid rope, is better than a single braid. A soft rope is preferred over stiff ropes at room temperature, because it is desired that the rope remain supple at deep water pressures and cold temperatures.

The rope is preferably made of monofilament fibers. However, flat fibers can be used provided they have UV stability and longevity and ability to sustain the weight of the mat.

The rope needs both UV stability and strength. It needs to be pliable for many years, preferably at least 20 years. Carbon black or a shielding material that slides over the entire length of the rope could be utilized to enhance the durability and longevity of the rope.

The color of rope can be camouflaged or colored depending on the application. It is contemplated the use of the color yellow would be good for handling the mats in deeper water, to aid in the placement of the mats.

A single length of rope is preferred for use in the present invention. It is preferred that the length of the rope be about 400 feet for a mat which is typically 8 feet by 20 feet in size, as the rope must pass in two directions in each element of the mat.

Fasteners for the non abrasive pads can basically be manufactured from any non-ferrous material. Use of ferrous materials for the fasteners will effect any device's cathodic protection system and are best avoided. Fasteners with similar lengths and head sizes are preferred. Fasteners can vary from standard size to larger or small sizes to accept or accommodate the anti-abrasive pad it must hold in place on each element. Preferably the fasteners are made from polymeric substances.

The concrete formula used in the mats can be varied and its cure rate can vary depending upon exterior temperature, humidity and mat thickness. Various fillers such as fiberglass and fly ash can be used, as well as epoxy, with or without accompanying elastomers.

As mentioned before, the purpose of the mat is the protection of underwater installations and the stabilization of the seabed near the installation. The mat can be used for shoreline protection as well, or to stabilize a shoreline which has metal structure projecting from it which is subject to barge wake or other boat wakes. Some subsea installations are covered with a delicate protective coating which can be damaged by the surface of the concrete element 10 of the mat 100. To preserve the delicate coating of subsea installations, a non-abrasive pad 50 is attached to at least one face 13 of the concrete element 10 as shown in FIG. 9 using fasteners which are directly embedded in the element without the use of adhesives. The fasteners, 70 can be any shape, a screw-like shape, a pin shape, conical square, tapered (like a spike). It is preferred that the fasteners have ridges, or alternatively feet which just out in a "L" shape or a "c" shape, or possibly a "t" shape into the portion embedded in the cement to prevent disengagement of the pads attached to the cement with the fasteners. Alternatively, the fasteners can be ram-set into cured concrete elements if cathodic protection is not important and shielding is not a factor. Ram set fasteners would be metal or ferrous material. These ferrous fasteners are a less desirable type of fastener because corrosion can occur in the ferrous fastener and over time, the pad can disengage from the element because of rusting or related deterioration of the metal. Alternatively, the pad can be tie-wrapped onto the element with a non-abrasive, marine animal resistant non-ferrous material and still provide the unique and beneficial ion flow into the underwater installation. The fastener material can be any warp resistant, non-metallic substance capable of good rigidity for holding the pads to the elements, such as polypropylene, polyester copolymer or combinations or variations thereof. It is advantageous, but not required that the fastener material be U.V. stabilized. Extruded fasteners are preferred over molded fasteners but either can be used. The non-abrasive pad 50 is situated between the concrete element 10 and the subsea installation 60 as shown in FIG. 8. The best material for the non-abrasive pad 50 is low-density polyethylene ("LDPE") although polyvinyl chloride ("PVC") and nylon also work well. As the pads 50 have no appreciable affect on the seabed, the pads 50 may be eliminated from those elements 10 which would not come in contact with the subsea installation 60. In the preferred embodiment, each of the elements 10 are fitted with a pad 50 so that any portion of the mat may be placed onto the subsea installation 60.

As shown in FIG. 9, the non-abrasive pad 50 is attached to the concrete element 10 by fasteners 70 at the hole 51 of the non-abrasive pad 50. A profile of a typical fastener 70 is shown in FIG. 10. Although the fasteners 70 may be placed into the element 10 by a variety of means, it is best to form the concrete element 10 around the fasteners 70 to provide the most secure attachment of the non-abrasive pad 50 to the element 10. Fastener 70 is preferably fitted with several ribs 71 which enhance the ability of the fastener 70 to keep the non-abrasive pad 50 attached to the element 10 after the concrete is formed around the fastener 70. Fastener 70 is also fitted with several flanges 72 as shown in FIG. 10. The flanges 72 are pressed into the non-abrasive pad 50 at the hole 51 in order to eliminate lateral or rotational movement of the non-abrasive pad 50 in relation to the fastener 70.

The fastener can be made of copolymers of polyester, which have enhanced rigidity over nylon. Suitable materials are PVC and LDPE. Other materials can be substituted for nylon if those materials are not abrasive to the protective coating of the subsea installation and the substitute material does not deteriorate significantly in sea water. In the most advantageous configuration, four fasteners are fitted onto each non-abrasive pad 50 and the concrete element 10 is formed around the fasteners ribs 71 of the fastener 70. In the preferred embodiment, each element 10 is fitted with a non-abrasive pad 50 on one face 13 as shown in FIG. 13.

Figure 11:
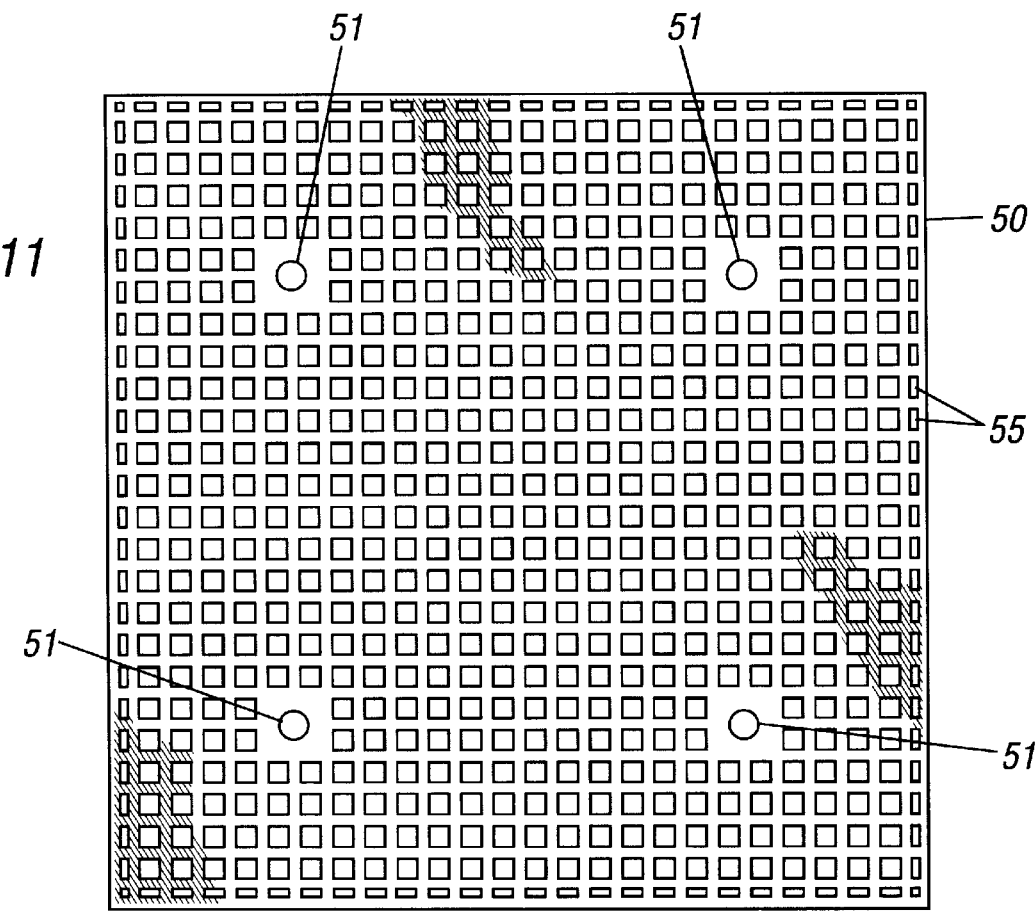
FIG. 11 is a tope view of a non-abrasive pad.
Figure 12:
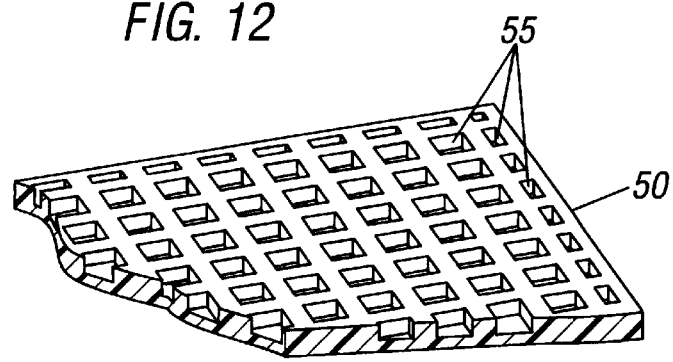
FIG. 12 is a perspective view of a non-abrasive pad.

A typical non-abrasive pad 50 is shown in FIGS. 11 and 12. Pad 50 is fitted with four fastener holes 51 which allow the fastener 70 to be fitted onto the pad 50 as shown in FIG. 9. In the optimum configuration, pad 50 contains an array of openings 55 as shown in FIGS. 11 and 12. The openings 55 serve a dual function. They insulate the concrete element from the thin film epoxy coated pipeline and allow the impressed ion current to flow through the non-abrasive pad to the pipeline, as shown in FIG. 8.

Figure 14:
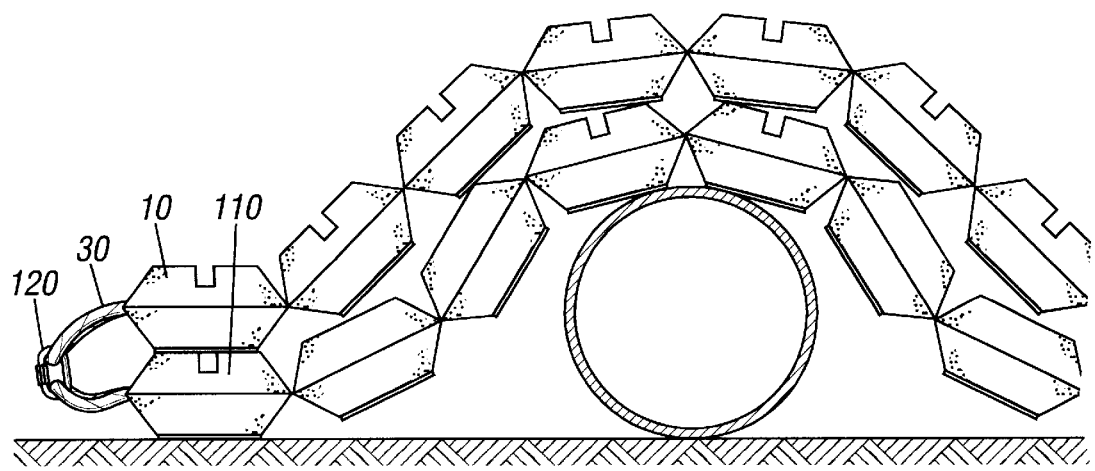
FIG. 14 is a view of the two mats deployed on top of each other connected together with fastening means.
Figure 15:
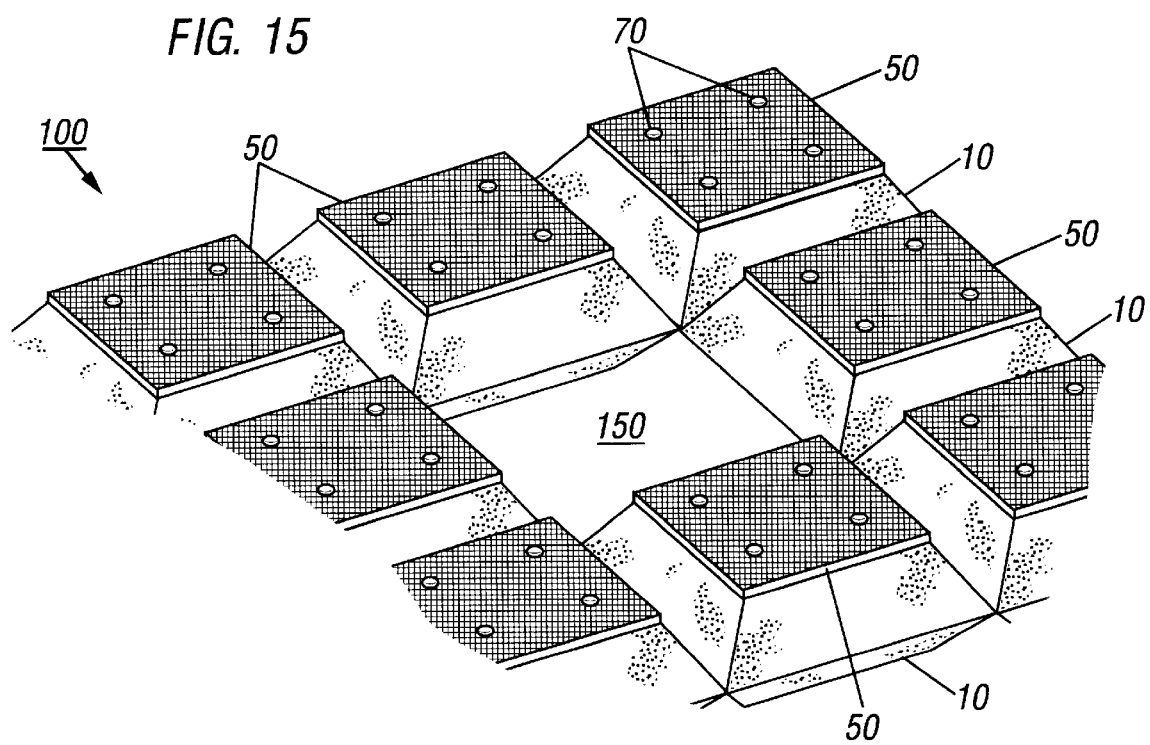
FIG. 15 is a view of a mat comprising elements with a hole in the middle for deployment around an obstacle.

FIG. 14 shows two mats 10 and 110 deployed such that one mat 10 lies over the top of mat 10. The mats are joined using a fastening means 120 attached to rope 30 which can be of any appropriate shape or material to prevent the mats from sliding apart on the sea floor. FIG. 15 shows the mat 10 with elements along the perimeter but having a hole or space 150 in the central part of the mat 10 so the mat can be disposed around an object, such as a pipe.

The method of making the invention, generally follows the following steps (i) creating a mold of the size needed for the mat having connected units;

(ii) disposing a mold release agent in each unit of the mold;

(iii) placing a rope throughout the mold connecting the units together;

(iv) flowing liquid concrete into the units in the molds, filling the units containing said rope and optionally, aspirating the units while the concrete is liquid to remove bubbles from the molds;

(v) permitting the units to partially cure at controlled temperatures;

(vi) disposing on each partially cured unit, a non-abrasive and non-shielding pad, utilizing at least one fastener to non-adhesively attach the pad to the element;

(vii) forming a groove on at least one of the elements said groove constructed and arranged to allow the rope from one mat to interconnect with the rope of a second unit; and (viii) releasing the units from the molds, forming a non-abrasive mat, capable of interlocking with a second mat.

The non-abrasive pad is preferably honey-combed, and made of a material which is pliable enough to work at ambient pressures and temperatures, and capable of permitting sustained negative ion flow to the underwater installation over time, allowing effective cathodic protection and the ability to support heavy weights and pressures.

The pad is preferably capable of resisting stiffening at 30° F. temperatures. Pads can be made of a variety of polymers, including durable polyvinyl chloride, mixtures of polymers or copolymers such as polypropylene, polyethylene, polybutylene or polyketone, or mixtures thereof, with or without fillers and UV stabilizers and antioxidants with or without non-metallic fillers or additives. Fillers can reduce cost and add strength to the polymer. Alternatively, a composite can be used.

The non-abrasive pads can be placed on only those single elements which touch the undersea installation that needs to be protected. Alternatively, they can be attached to each face of each element or to alternating faces of each element of the mat.

If the underwater installation is a pipeline, mats can be placed both under a pipeline as well as on top of the pipeline for protection, with non-abrasive pads touching said pipeline. Selected elements of the mats can be removed to place the mat around a structure as well.

Mats are preferably made using a molding release agent of fish oil such as menhaden oil or other environmentally safe oils, such as white oils, but mold release agents can also be materials such as Teflon.

Although the present invention is described and illustrated above with detailed reference to the preferred embodiment, the invention is not limited to the details of such embodiment but is capable of numerous modifications, by one of ordinary skill in the art, within the scope of the following claims.

We claim:

1. A mat for protecting structures exposed to hydrodynamic forces having at least one non-abrasive and non-shielding protective pad comprising:

a plurality of elements which are capable of conforming to various terrains, each of said elements having the following:

the shape of two symmetrically opposed geometrically identical elements, said elements arranged in parallel rows and columns with sufficient space between each of said elements to allow adjacent elements to conform to an uneven surface or to move flexibly;

a flexible rope, said rope constructed and arranged to pass through said center of each of said elements in two directions and embedded therein to fasten said elements to each other by said rows and by columns, said rope providing a small loop at the exit and entrance of alternating rows and alternating columns for the purpose for handling said mat during transportation and installation; and at least one separate non-abrasive and non-shielding pad per element, said pad attached to at least one of said elements by at least one fastener embedded in said at least one of said elements, said pad situated on at least one of said faces of at least one of said elements providing spacing from at least one of said elements.

2. The mat according to claim 1 wherein said fastener is made of a non-abrasive, corrosion resistant material to external forces.

3. The mat according to claim 2, wherein said fastener comprises a non-metallic substance.

4. The mat according to claim 1, wherein the geometric shapes of the elements are selected from the group: conical and pyrimidical shapes.

5. The mat according to claim 1 wherein said separate non-abrasive and non-shielding pad is attached to at least one of said faces of said elements with at least one fastener, said fastener is embedded in said element.

6. The mat according to claim 1 wherein said pad is attached to said face of said element with a plurality of fasteners, said fasteners are embedded in said element.

7. The mat according to claim 1 wherein said pad is a member of the group comprising: polyvinyl chloride, low-density polyethylene or mixtures thereof.

8. The mat according to claim 1, wherein the rope is looped on the edges of the mat for ease in handling.

9. The mat according to claim 1, further comprises a groove on at least one of said elements, said groove constructed and arranged to allow said loop of a second mat to be placed into said groove in order to attach said second mat to said mat.

10. The mat according to claim 1 wherein the flexible rope comprises a polymeric material.

11. The mat according to claim 10, wherein the flexible rope is a 3 braid rope capable of sustaining at least 9,000 psi.

12. The mat according to claim 1, wherein the elements comprise concrete.

13. The mat of claim 1, having dimensions of 20 feet by 8 foot by 4 and ½ inches thick.

14. The mat of claim 1, having dimensions of at least 2 element long and 1 elements wide.

15. The mat of claim 1, having the dimensions of 4 feet by 10 feet by 4 and ½ inches wide.

16. The mat of claim 1, having a width of from 4 to 10 inches.

17. The mat of claim 1, having from 2 to 160 elements.

18. The mat of claim 1, which is further comprised of two mats joined together, with the rectangular flat bases of said elements are facing the other, and said mats are connected with fastening means attached to the flexible rope.

19. The mat of claim 1, constructed to provide a hole in a portion of the mat to permit the mat to be pivotally disposed around an obstacle.

20. The mat of claim 12, wherein the mat can comprise a length of at least 40 feet and an appropriate width such that the mat can survive barge loading or towing to a deep water site.

21. The mat of claim 1, wherein the concrete of the elements is further mixed with elastomeric materials to provide an element which is capable of sustaining impact without deterioration.

22. The mat of claim 1, wherein the fastener comprises a non-metallic material such as a member selected from the group, polypropylene, polyethylene, polybutylene, polyketone, polyvinyl chloride or mixtures thereof.

23. The mat of claim 1, wherein said rope is braided, having ultraviolet stability added to the fibers of said rope, and a dimension of ⅝" diameter.

24. A method for making mats for protection of structures exposed to mild and severe hydrodynamic forces comprising (i) creating a mold of the size needed for the mat having connected units;

(ii) disposing a mold release agent in each unit of said mold;

(iii) placing a rope throughout the mold connecting the units together;

(iv) flowing liquid concrete into the units in the molds, filling the units containing said rope;

(v) permitting said units to partially cure at controlled temperatures;

(vi) disposing on each partially cured unit, a separate non-abrasive and non-shielding pad per element, utilizing at least one fastener to non-adhesively attach said pad to said element;

(vii) forming a groove on at least one of said elements said groove constructed and arranged to allow the rope from one mat to interconnect with the rope of a second unit; and (viii) releasing said units from said molds, forming a non-abrasive and non-shielding mat, capable of interlocking with a second mat.

25. The method of claim 24, wherein the molds are first sprayed with a mold release agent selected from the group consisting of Teflon, white oil, menhaden fish oil, and environmentally safe mold release agents.

26. The method of claim 24, wherein the concrete is premixed with a member of the group consisting of elastomers, epoxy and mixtures thereof.

27. The method of claim 24, wherein the concrete while wet is aspirated in the mold to remove bubbles and air pockets.

28. The method for making a mat according to claim 25 wherein said fastener is made of nylon.

29. The mat according to claim 12, wherein the concrete is mixed with fillers prior to curing, wherein the fillers are selected from the group: fiberglass, fly ash, epoxy or mixtures thereof.

\* \* \* \* \*